(12) United States Patent
Moorcroft (10) Patent No.: US 10,234,024 B2
(45) Date of Patent: Mar. 19, 2019

(54) VEHICLE CONTROL METHOD

(71) Applicant: JAGUAR LAND ROVER LIMITED, Warwickshire (GB)

(72) Inventor: Adam Moorcroft, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 145 days.

(21) Appl. No.: 15/323,749

(22) PCT Filed: Jul. 9, 2015

(86) PCT No.: PCT/EP2015/065732
§ 371 (c)(1),
(2) Date: Jan. 4, 2017

(87) PCT Pub. No.: WO2016/005510
PCT Pub. Date: Jan. 14, 2016

(65) Prior Publication Data
US 2017/0159804 A1    Jun. 8, 2017

(30) Foreign Application Priority Data

Jul. 9, 2014 (GB) .................................. 1412184.2

(51) Int. Cl.
*F16H 61/02* (2006.01)
*F16H 59/78* (2006.01)
(Continued)

(52) U.S. Cl.
CPC ......... *F16H 61/0213* (2013.01); *F16H 59/78* (2013.01); *F16H 61/16* (2013.01);
(Continued)

(58) Field of Classification Search
CPC ...... F16H 59/78; F16H 61/0213; F16H 61/16; F16H 2061/0216; F16H 2061/0241;
(Continued)

(56) References Cited

U.S. PATENT DOCUMENTS 4,324,210 A    4/1982 Aoyama
6,408,806 B2 *  6/2002 Sugiyama ................. F01L 1/34
                                                         123/90.12
(Continued)

FOREIGN PATENT DOCUMENTS

EP    2003371 A2    12/2008
GB    2296792 A     7/1996
(Continued)

OTHER PUBLICATIONS

Combined Search and Examination Report under Sections 17 and 18(3) for Application No. GB1512021.5 dated Jan. 11, 2016.
(Continued)

*Primary Examiner* — David R Morris
(74) *Attorney, Agent, or Firm* — Carlson, Gaskey & Olds (57) ABSTRACT

A control method for controlling a transmission of a vehicle, the method comprising: receiving at least one measurement relating to a hydraulic lag of a continuously variable valve lift system that occurs in a cold condition, the continuously variable valve lift system being associated with an engine of the vehicle; determining, based on the at least one measurement relating to the hydraulic lag, an engine speed threshold above which engine power output is impaired as a result of the hydraulic lag; monitoring the engine speed; and generating an alert if the engine speed exceeds the engine speed threshold.

15 Claims, 5 Drawing Sheets

(51) Int. Cl.
*F16H 61/16* (2006.01)
*F02D 13/02* (2006.01)

(52) U.S. Cl.
CPC ... *B60Y 2300/1884* (2013.01); *F02D 13/0207* (2013.01); *F16H 2061/0216* (2013.01); *F16H 2061/0241* (2013.01); *F16H 2061/166* (2013.01)

(58) Field of Classification Search
CPC .......... F16H 2061/166; F02D 13/0207; F02D 2013/0292; F02D 2013/0296
See application file for complete search history.

(56) References Cited

U.S. PATENT DOCUMENTS

| | | | |
|---|---|---|---|
| 6,840,201 B2 * | 1/2005 | Miura | F01L 1/022 123/348 |
| 7,675,404 B2 * | 3/2010 | Kanzaka | B60K 35/00 180/171 |
| 2003/0172888 A1 | 9/2003 | Miura | |
| 2008/0007393 A1 | 1/2008 | Kanzaka | |

FOREIGN PATENT DOCUMENTS

| | | |
|---|---|---|
| JP | S6245960 A | 2/1987 |
| JP | H06270721 A | 9/1994 |
| JP | H106816 A | 1/1998 |
| JP | H10175462 A | 6/1998 |
| JP | H1148830 A | 2/1999 |
| JP | 2004092593 A | 3/2004 |

OTHER PUBLICATIONS

International Search Report and Written Opinion of the International Searching Authority for International application No. PCT/EP2015/065732 dated Oct. 5, 2015.
Combined Search and Examination Report under Sections 17 and 18(3) for Application GB14121842 dated Jan. 16, 2015.

* cited by examiner

VEHICLE CONTROL METHOD

FIELD OF THE INVENTION

This invention relates to a vehicle control method, in particular to a method for optimising use of a continuously variable valve lift system in an engine. Aspects of the invention relate to a control method, to a control system, to a computer readable medium, to a processor, and to a vehicle.

BACKGROUND

It is well established that the ability to vary the extent and duration of opening of an engine inlet valve offers clear advantages in terms of engine performance and efficiency. For example, it is often desirable to implement a higher valve lift when the engine is running at a relatively high speed in order to maximise performance, while lowering the valve lift at lower engine speeds so as to improve efficiency. Similarly, holding the inlet valve open for longer at high engine speeds further increases performance.

Mechanical variable valve lift systems are known, in which a pair of cam sets is provided to drive the inlet valves; one cam set optimised for providing low valve lift at low engine speeds, and the other for providing higher valve lift at higher engine speeds. The vehicle switches between cam sets when an engine speed threshold is passed. This type of arrangement is often referred to as 'cam profile switching'. A drawback with such arrangements is that the switching creates a step change in engine output, resulting in reduced refinement. Even if the switch is timed to coincide with a crossing point for respective torque curves of each of the cam sets, there can be a momentary loss of performance during the switch.

For this reason, various continuously variable valve lift (CVVL) systems have been proposed, and many are in use in modern vehicles. These systems are able to control valve lift to any desired level within the operational range of the valve. This means that valve lift can be optimised throughout the engine speed range, thereby enabling true optimisation of engine performance.

One such arrangement employs a hydraulic system for controlling valve lift. While this system is very effective under normal operating conditions, a problem has been identified where the engine is started in very cold conditions, for example at a temperature of below −10° C. This is because the viscosity of oil used as hydraulic fluid rises significantly at such low temperatures, to the extent that the responsiveness of the system is reduced. A particular problem arising from this is that the time taken for the valve to close is extended, leading to a loss of torque when the inlet valve remains open during part of a compression stroke of a respective engine cylinder.

It is against this background that the present invention has been devised.

SUMMARY OF THE INVENTION

According to an aspect of the invention there is provided a control method for controlling a transmission of a vehicle. The method comprises: receiving at least one measurement relating to a hydraulic lag of a continuously variable valve lift system that occurs in a cold condition, the continuously variable valve lift system being associated with an engine of the vehicle; determining, based on the at least one measurement relating to the hydraulic lag, an engine speed threshold above which engine power output is impaired as a result of the hydraulic lag; monitoring the engine speed; and generating an alert if the engine speed exceeds the engine speed threshold.

The method may comprise estimating a value for the hydraulic lag based on the or each measurement, and determining the engine speed threshold based on the value for the hydraulic lag.

The transmission may be either manual or automatic. If manual, the alert can be displayed to the user to instruct them to change gear in the event that the engine speed threshold is exceeded. Display of the alert could be, for example, by way of 'change up' arrows on an instrument pack.

If the transmission is automatic, the method may comprise using the alert to control the automatic transmission so as to ensure that the engine speed does not exceed the engine speed threshold.

The term 'alert' as used in this description may be taken to include use of the word in the sense of the term 'signal'.

The hydraulic lag that is measured indirectly is instantaneous and may vary over time. In particular, the hydraulic lag will diminish as hydraulic oil viscosity reduces. By using measurements indicative of the hydraulic lag or optionally using those measurements to calculate an instantaneous hydraulic lag, the engine speed threshold can be continuously updated to reflect varying conditions. This enables optimisation of engine power output at all times according to the instantaneous available power, such that the maximum power that is available from the engine at any given time is delivered on demand.

The engine speed threshold may be determined so as to ensure that an inlet valve of the system closes before commencement of a compression stroke of an engine cylinder with which the valve is associated. Alternatively, the threshold can be determined so as to allow the valve to close soon after the compression stroke commences. This latter option may be acceptable as there is limited piston movement at the start of the compression stroke, as the piston follows a generally sinusoidal profile. Therefore, little air will be forced out through the valve if it is open in the early part of the compression stroke, ensuring sufficient air remains trapped in the cylinder.

The measurement relating to a hydraulic lag of the continuously variable valve lift system that occurs in a cold condition may be indicative of the magnitude of the hydraulic lag, or it may simply indicate that the hydraulic lag is non-zero. In the latter case, which reflects a relatively simple embodiment of the invention, estimating a value for the hydraulic lag may entail assigning a constant maximum value to the hydraulic lag if it is detected to be non-zero, and determining the engine speed threshold based on this constant value. In this case, a constant engine speed threshold is applied throughout an entire period of operation in the cold condition.

The method may comprise: comparing the engine speed threshold with a pre-determined engine speed limit related to a currently selected gear used by the automatic transmission in normal operation; determining whether the engine speed threshold is lower than the pre-determined engine speed limit; and replacing the pre-determined engine speed limit with the engine speed threshold in the event that the threshold is lower than the pre-determined limit.

The method may also comprise: receiving a gear downshift request; determining an instantaneous vehicle speed; calculating a projected engine speed for the requested gear based on the instantaneous vehicle speed and engine load; comparing the projected engine speed with the engine speed threshold; and denying the downshift request in the event that the projected engine speed is above the engine speed threshold. In this embodiment, the method may comprise allowing the downshift request in the event that the projected engine speed is below the engine speed threshold.

Conveniently, the method may comprise effecting a gear upshift automatically via the automatic transmission in the event that the engine speed reaches the engine speed threshold.

The at least one measurement relating to a hydraulic lag may be one or more of the group consisting of: oil viscosity in the continuously variable valve lift system; oil temperature in the continuously variable valve lift system; an inlet valve lift; and events after engine ignition.

In another aspect of the invention, there is provided a vehicle control system for controlling a transmission of a vehicle. The system comprises sensing means arranged to receive at least one measurement relating to a hydraulic lag of a continuously variable valve lift system that occurs in a cold condition, the continuously variable valve lift system being associated with an engine of the vehicle, and processing means arranged to determine, based on the at least one measurement relating to the hydraulic lag, an engine speed threshold above which engine power output is impaired as a result of the hydraulic lag. The system further comprises monitoring means arranged to monitor the engine speed, and output means arranged to generate an alert if the engine speed exceeds the engine speed threshold.

In cases where the transmission is an automatic transmission, the system may comprise control means arranged to control the automatic transmission of the vehicle in response to the alert so as to ensure that the engine speed does not exceed the engine speed threshold, thereby to maintain engine power output.

The sensing means may comprise a temperature sensor arranged to output a measurement indicative of a temperature of oil in the continuously variable valve lift system.

The sensing means may comprise at least one of a viscometer and a rheometer arranged to output a measurement indicative of a viscosity of oil in the continuously variable valve lift system.

In further aspects of the invention, there is provided a non-transitory computer readable medium loaded with computer code arranged to effect the above described method, a processor arranged to implement the above described method, and a vehicle arranged to implement the above described method.

In a yet further aspect of the invention, there is provided a vehicle comprising the above described system or processor.

In addition to hydraulic lag, the engine speed limit may alternatively be dictated by other electro-mechanical-hydraulic limitations of continuously variable valve lift systems, including: high cold current draw, hydraulic excitations, and mechanical forces. In view of this, in yet another aspect of the invention, there is provided a control method for controlling a transmission of a vehicle, the method comprising: receiving at least one measurement relating to a cold condition parameter of a continuously variable valve lift system, the continuously variable valve lift system being associated with an engine of the vehicle; determining, based on the at least one measurement relating to the parameter, an engine speed threshold above which engine power output is impaired as a result of the parameter; monitoring the engine speed; and generating an alert if the engine speed exceeds the engine speed threshold.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

Embodiments of the present invention will now be described, by way of example only, with reference to the accompanying drawings, in which like components are assigned like numerals, and in which.

DETAILED DESCRIPTION

Figure 1:
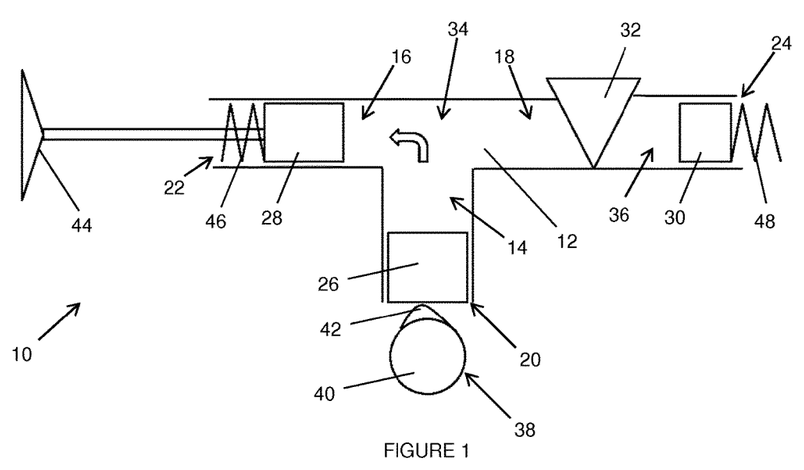
FIG. 1 is a schematic drawing of a hydraulic CVVL system in a first state.
Figure 2:
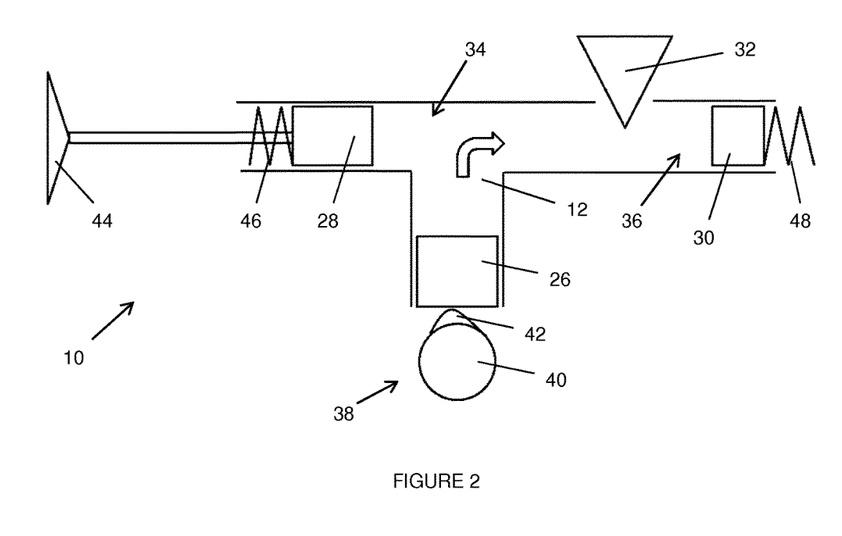
FIG. 2 is a schematic drawing of the hydraulic CVVL system of FIG. 1 in a second state.

FIGS. 1 and 2 illustrate in schematic form the hydraulically operated CVVL system 10 referred to above. The system 10 is described here so as to clearly illustrate the problem associated with cold start of the engine where the responsiveness of the system 10 is reduced as a result of slowed inlet valve closure. It should be appreciated that the particular system 10 here described is included by way of example only, and that various alternative arrangements exist to which embodiments of the invention are equally applicable.

The CVVL system 10 includes a working chamber 12 which is formed from a pair of cylindrical bores that intersect to form a 'T' shaped arrangement, such that the working chamber 12 has first, second and third branches 14, 16, 18 defining respective first, second and third openings 20, 22, 24. Each opening 20, 22, 24 receives a respective cylindrical plunger: a cam plunger 26 received within the first opening 20, a valve plunger 28 received within the second opening 22, and a control plunger 30 received within the third opening 24. The plungers 26, 28, 30 are arranged to slide axially within their respective branches, and mechanical stops (not shown) are provided to limit their range of movement, thereby defining respective rest positions for the plungers. Each plunger is biased towards its rest position by a respective spring, as described further below. The control plunger 30 and the valve plunger 28 are biased inwardly into the working chamber 12, with respective mechanical stops limiting said inward movement, while the cam plunger 26 is biased outwardly from the working chamber 12, with a respective mechanical stop limiting said outward movement.

Each of the plungers forms a seal around its circumference against a tubular inner wall of the respective branch of the working chamber 12. The working chamber 12 is filled with oil, which is contained within the working chamber 12 by virtue of the plunger seals. In this way a hydraulic system is created, such that inward movement of any of the plungers into the working chamber 12 raises the pressure of the oil, which in turn applies pressure to the other two plungers, urging them outwardly from the working chamber 12. The oil therefore behaves as a hydraulic reservoir that transfers forces between the plungers.

It is noted that some leakage may occur across the plunger seals, causing drainage of the working chamber 12 over time. To mitigate this, additional oil is typically supplied to the working chamber 12 by a main engine oil pump via a check valve, although for simplicity this is not shown in FIGS. 1 and 2.

A solenoid valve 32 is positioned in the third branch 18 of the working chamber 12. The solenoid valve 32 is operable to selectively isolate a portion of the working chamber 12 containing the control plunger 30 from the rest of the working chamber 12, thereby dividing the working chamber 12 into two portions: a high pressure chamber 34 which contains the cam plunger 26 and the valve plunger 28; and a medium pressure chamber 36 which contains the control plunger 30.

FIG. 1 shows the solenoid valve 32 in a closed position in which the medium pressure chamber 36 is isolated from the high pressure chamber 34, and FIG. 2 shows the solenoid valve 32 in an open position, in which the medium pressure chamber 36 is in communication with the high pressure chamber 34. In this embodiment, the solenoid valve 32 occupies the open position when deactivated, and moves to the closed position upon activation.

A cam 38 associated with a camshaft (not shown) of the vehicle is disposed immediately beneath the cam plunger 26, such that the cam 38 is in sliding contact with the cam plunger 26. In other arrangements, the cam 38 may drive the plunger 26 indirectly via a roller follower, a rocker or a slider, for example. The camshaft is driven by a crankshaft in a conventional manner. In this embodiment the cam 38 comprises a disc-like main body 40, or 'base circle', which is carried centrally on the camshaft, and an outer lobe 42 arranged to impart a force to the cam plunger 26 as the cam 38 rotates. In other embodiments an eccentrically mounted cam may be used.

When the cam 38 rotates to an orientation at which a rising flank of the lobe 42 meets the cam plunger 26, the cam plunger 26 begins to ride up the rising flank of the lobe 42. This in turn urges the cam plunger 26 upwards into the high pressure chamber 34. As the cam 38 continues to rotate, the lobe 42 presses the cam plunger 26 further upwards. This continues until the cam plunger 26 rides to the top of the rising flank of the lobe 42, such that the cam plunger 26 sits on the radially widest point of the lobe 42, at which point a maximum cam plunger 26 displacement is defined.

Once the cam 38 passes the position corresponding to the maximum cam plunger 26 displacement, the cam plunger 26 falls down a trailing flank of the lobe 42, which allows the cam plunger 26 to gradually move downwards. A spring (not shown) is provided to bias the cam plunger 26 into contact with the cam 38. When the cam plunger 26 falls to the end of the trailing flank of the lobe 42, the plunger rides over the main body 40 of the cam 38. Since the main body 40 of the cam 38 is generally circular and centrally mounted on the camshaft, the location of the point of contact between the main body 40 of the cam 38 and the cam plunger 26 does not change until the cam 38 rotates to the extent that the cam plunger 26 meets the rising flank of the lobe 42 again. The cam plunger 26 is therefore substantially stationary while riding over the main body 40 of the cam 38, and so a cam plunger 26 rest position is defined.

Therefore, rotational movement of the cam 38 is translated into reciprocating linear motion of the cam plunger 26 within the high pressure chamber 34. It is noted that the reciprocating motion of the cam plunger 26 is not continuous; the cam plunger 26 only moves during periods where it is in contact with the lobe 42 of the cam 38, and is stationary for the periods where it is in contact with the main body 40 of the cam 38.

The valve plunger 28 is mechanically coupled to an inlet valve 44 of a cylinder of the engine of the vehicle. Inward movement of the valve plunger 28 into the high pressure chamber 34 translates into closing of the inlet valve, and outward movement of the valve plunger 28 translates into opening of the inlet valve 44, with the degree of plunger movement determining the extent of valve lift. A valve spring 46 is provided to bias the valve plunger 28 into the high pressure chamber 34. Therefore, the default position of the valve plunger 28 corresponds to the inlet valve 44 being closed, and so the inlet valve 44 remains closed unless the cam plunger 26 is displaced from its rest position by the cam 38 while the solenoid valve 32 is in its closed position.

A control spring 48 is located behind the control plunger 30 relative to the working chamber 12. The control spring 48 therefore acts to bias the control plunger 30 into the medium pressure chamber 36. It is noted that the control spring 48 is not as strong as the valve spring 46. Therefore, when the solenoid valve 32 is open, if the pressure in the high pressure chamber 34 exceeds that in the medium pressure chamber 36, the control plunger 30 cannot move inwards; indeed the control plunger 30 is forced outwardly, compressing the control spring 48, until the pressures in the high and medium pressure chambers 34, 36 equalise, or otherwise until the control plunger 30 reaches its maximum displacement as defined by its respective mechanical stop.

In operation, as shown in FIG. 1, as the cam 38 rotates the lobe 42 forces the cam plunger 26 upwardly into the high pressure chamber 34. This raises the pressure of the oil in the high pressure chamber 34, which in turn creates a hydraulic force on the valve plunger 28 as the oil pressure acts over the area of an end face of the plunger. The hydraulic force overcomes an opposite force exerted on the valve plunger 28 by the valve spring 46, with the result that the valve plunger 28 is urged outwardly from the high pressure chamber 34.

In other words, upward movement of the cam plunger 26 displaces a volume of oil, which in turn induces a corresponding displacement of the valve plunger 28, with the extent of the displacement of the valve plunger determined by the ratio of the diameters of the first and second branches 14, 16 of the working chamber 12. Therefore, upward movement of the cam plunger 26 in response to the rotation of the cam effects outward axial movement of the valve plunger 28, thereby opening the inlet valve 44.

It is noted that the solenoid valve 32 is closed at this stage, and so the volume of oil on which the cam plunger 26 acts is fixed. In these conditions a fixed ratio is defined between the axial displacement of the cam plunger 26 and the axial displacement of the valve plunger 28. Therefore, a given cam plunger 26 displacement would always effect a specific valve plunger 28 displacement. For simplicity, for the purposes of describing the operation of the system 10, oil is assumed to be an incompressible fluid. On this basis, if the cam plunger 26 and the valve plunger 28 are of the same diameter, the valve plunger displacement is equal to the cam plunger 26 displacement for a fixed volume of oil.

However, if the solenoid valve 32 is opened, the oil has an alternative escape route when pressure is applied by the cam plunger 26, namely to flow into the medium pressure chamber 36, as shown most clearly in FIG. 2. Since the control spring 48 is weaker than the valve spring 46, the control plunger 30 moves more readily than the valve plunger 28. Under these circumstances the oil takes the path of least resistance, meaning that further displacement of oil through movement of the cam plunger 26 causes outward movement of the control plunger 30, rather than outward movement of the valve plunger 28. Therefore, once the solenoid valve 32 opens, the valve plunger 28 does not open any further; movement of the cam plunger 26 only effects movement of the valve plunger 28 while the solenoid valve 32 is activated and closed.

Indeed, as the valve spring 46 is stronger than the control spring 48, once the solenoid valve 32 is opened the valve spring 46 starts to overcome the control spring 48, therefore urging the valve plunger 28 back into the working chamber 12. Accordingly, the inlet valve begins to close once the solenoid valve 32 opens, and so the peak inlet valve opening corresponds to the moment at which the solenoid valve 32 opens. In this way, a generally sinusoidal opening profile is maintained for the inlet valve, albeit reduced in magnitude relative to full inlet valve opening that occurs the solenoid valve 32 is held closed. It is noted that the relative strengths of the valve spring 46 and the control spring 48 are carefully balanced in order to ensure that the inlet valve opening profile corresponds to the profile of the cam lobe 42. For example, if the control spring 48 is too weak relative to the valve spring 46, the inlet valve would close almost immediately when the solenoid valve 32 opens.

Through making use of this principle, any desired lift of the inlet valve 44 (which corresponds to lift of the valve plunger 28) within the operational range can be achieved through appropriate control of the timing of the solenoid valve 32 opening. The timing of the valve lift can also be varied; although only within the limitations created by the profile and rotational speed of the cam lobe 42, since valve lift can only occur by action of the cam lobe 42.

The solenoid valve 32 can be controlled to open at any point during a cam plunger stroke cycle, which is defined as one complete oscillation of the cam plunger 26 between its rest position and its maximum upper displacement. If a maximum valve lift is desired, the solenoid valve 32 is activated so as to remain closed throughout the cycle, such that the upward movement of the cam plunger 26 gives rise to a maximum displacement of the valve plunger 28. If zero valve lift is required, the solenoid valve 32 is deactivated such that it is held open for the entire cam plunger stroke cycle. For any other desired valve lift, the solenoid valve 32 is activated at a time that is calculated so as to provide the desired lift or valve closing time.

It is also noted that since the valve plunger 28 cannot move outwardly from the working chamber 12 while the solenoid valve 32 is open, the point at which inlet valve lift commences can be delayed by holding the solenoid valve 32 open when the cam plunger 26 begins to ride up the rising flank of the cam lobe 42. The solenoid valve 32 is then closed at the point at which opening movement of the inlet valve is to start.

When the cam stroke cycle completes, the cam plunger 26 returns to its rest position. As the oil pressure reduces, the valve spring 46 is able to return the valve plunger 28 to its rest position. It is noted that the oil pressure remains elevated until both the cam plunger 26 and the valve plunger 28 are in their rest positions. This means that the control plunger 30 cannot start to move back into the working chamber 12, since the force exerted by the control spring 48 is overcome by the force exerted by the valve spring 46.

Once the valve plunger 28 reaches its rest position, the oil pressure is reduced to a minimum, and so the control plunger 30 starts to move towards its respective rest position under the action of the control spring 48. The solenoid valve 32 is then activated such that the medium pressure chamber 36 is isolated from the high pressure chamber 34, in preparation for the next cam plunger stroke cycle. Typically, the solenoid valve 32 is activated just before valve lift is required, to avoid drawing electrical current to no effect by holding the solenoid valve 32 open for longer than necessary.

It is noted that the solenoid valve 32 is typically deactivated for at least part of the portion of the cam stroke cycle in which the cam plunger 26 occupies its rest position, to ensure that no high pressure oil is trapped in the medium pressure chamber 36, which would otherwise compromise valve lift in a subsequent cycle.

The minimum inlet valve lift that is achievable with this system 10 is determined by the range of movement of the control plunger 30. Therefore, the CVVL system 10 is configured such that the control plunger 30 has a range of movement that is suitable to accommodate the range of valve lifts required of the inlet valve 44. Typically, the control plunger 30 is arranged to have at least the same range of movement as the valve plunger 28 such that no valve lift is generated if the solenoid valve 32 is held open throughout an entire cam stroke cycle.

The above description of the functioning of the CVVL system 10 holds true under normal operating conditions. However, as alluded to previously, a problem arises when the CVVL system 10 is operated in very cold conditions, for example when the vehicle is first started in an ambient temperature of less than −10° C.

Under these conditions, the oil in the working chamber 12 is very cold, and consequently its viscosity is relatively high. The force exerted by the valve spring 46 is unchanged, and so the raised viscosity of the oil has the effect of extending the time taken for the valve spring 46 to return the valve plunger 28 to its rest position as the cam plunger 26 moves outwardly from the working chamber 12 after a valve opening. The slowed movement of the valve plunger 28 causes the inlet valve 44 to remain open for longer than intended. This delay due to the characteristics of the hydraulic system 10 at low temperature is known as a 'hydraulic lag'.

As the cam plunger spring is typically strong enough to hold the cam plunger 26 in contact with the cam lobe 42 throughout valve closing even in conditions of hydraulic lag, a local vacuum will form above the cam plunger 26.

Since the hydraulic lag is primarily a function of the viscosity of the oil and the force exerted by the valve spring 46, the extent of the lag is not dependent on engine speed. Instead, for a given oil temperature and valve lift, the resulting lag is substantially constant in absolute terms. Therefore, as engine speed increases, the inlet valve 44 remains open for a progressively larger proportion of the engine cylinder stroke, i.e. through a proportionally longer crank angle. This means that at higher engine speeds the inlet valve 44 may still be open when a compression stroke commences. As a consequence, air that was previously inducted into the engine cylinder is forced back through the inlet valve 44, resulting in loss of engine power.

Figure 3:
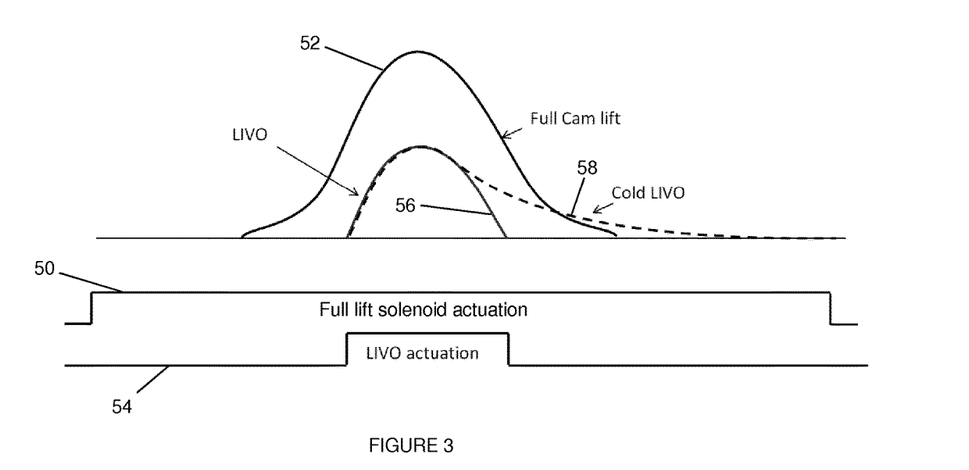
FIG. 3 is a graph showing operation of the CVVL system of FIG. 1 in a range of operating conditions.
Figure 4:
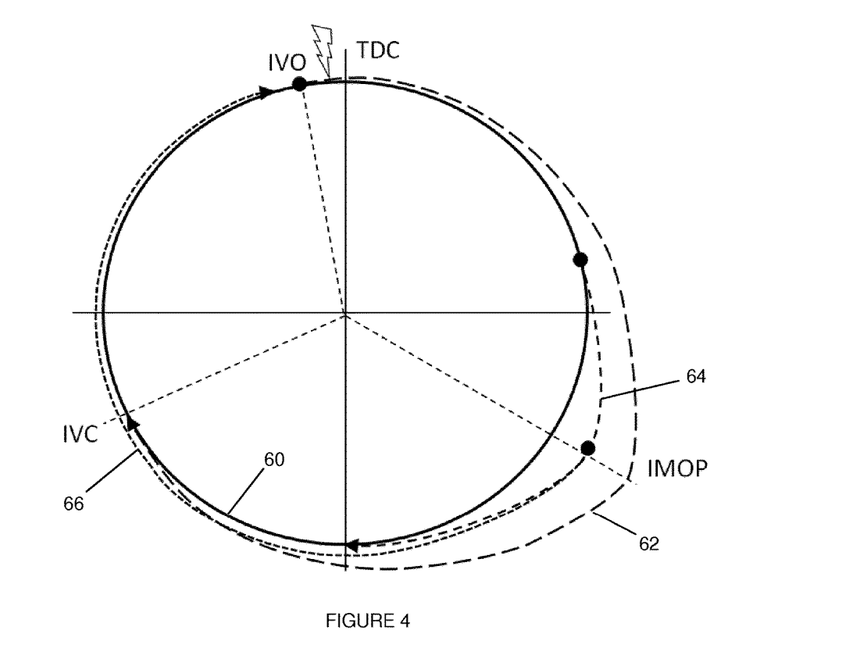
FIG. 4 is a graph representing the data of FIG. 3 in a polar format.

This behaviour is illustrated in FIGS. 3 and 4, which graphically compare valve lift profiles for the inlet valve 44 in normal operation and in a cold start condition.

FIG. 3 shows a pair of waveforms in the form of square waves that represent input signals used to control the CVVL system 10. Above the waveforms, three different response profiles are represented with respective graph curves, the response profiles reflecting valve lift against engine crank angle in response to the input signal. Assuming constant engine speed, each of these lines therefore represents changes over time, and the length of the lines represents the duration of one complete engine piston cycle.

The uppermost input signal 50 corresponds to a scenario in which the inlet valve 44 is fully opened. Accordingly, as explained previously, the solenoid valve 32 is activated to move into the closed position for the duration of the cam stroke cycle. The activation of the solenoid valve 32 is indicated by the peak of the square wave. The resulting valve lift profile 52 is indicated by the largest curve in the graph above, which also illustrates how the extent of the valve lift varies according to the position of the cam, rising first to a peak and then falling away again in a symmetrical manner.

The full cam lift response demonstrates the timing of the cam plunger stroke cycle: the point at which the valve begins to lift corresponds to the moment at which the cam plunger 26 begins to ride up the rising flank of the cam lobe 42, and the point at which valve lift returns to zero corresponds to the moment at which the cam plunger 26 finishes falling down the trailing flank of the cam lobe 42. As illustrated in FIG. 3, the solenoid valve 32 is actually activated prior to commencement of the cam stroke. Similarly, the solenoid valve 32 is deactivated after the inlet valve 44 closes to reduce energy consumption and also to allow oil to be pumped into the medium pressure chamber 36 to compensate for leakage.

The lower input signal 54 corresponds to a demand for a reduced valve lift. As discussed previously, reduced valve lift may be used, for example, at low engine speeds in order to improve efficiency. In order to effect a reduced valve lift compared with the full valve lift profile 52 described above, the solenoid valve 32 is activated for only part of the cam stroke cycle, and activation of the solenoid valve 32 is delayed so as to delay initial opening of the inlet valve. This can be observed from the form of the square wave of the lower input signal 54, in which the duration of the peak is reduced compared with the upper input signal 50. This technique is referred to as late inlet valve opening (LIVO).

Two different response profiles are shown which correspond to the shorter activation lower input signal 54. The first response profile 56, which is represented by a solid line, relates to normal operation. As expected, the peak for this response is reduced compared with the full cam lift profile 52, indicating partial valve lift. The form of the response is similar to the full lift profile 52, being a symmetric curve. The second response profile 58 is indicated by a dashed line, and corresponds to a projected valve lift response in a cold start scenario.

For the first response profile 56, it is noted that the point at which the inlet valve 44 begins to open substantially corresponds to the point of activation of the solenoid valve 32 as indicated by the peak of the square wave of the input signal. It is further noted that the solenoid valve 32 is not deactivated until the inlet valve 44 has closed to avoid early valve closure. As noted previously, the solenoid valve 32 is deactivated following closure of the inlet valve 44 to allow the pressure of the oil in the medium pressure chamber 36 to reduce, thereby enabling the control plunger 30 to return to its rest position once the inlet valve 44 closes. If the solenoid valve 32 were to remain closed, high pressure oil would be trapped in the medium pressure chamber 36, and the control spring 48 would be unable to move the control plunger 30. Therefore, valve lift would be compromised in the subsequent cam stroke cycle, as there would be less oil available in the high pressure chamber.

The cold start response is similar to the normal response for the first part of the LIVO lift until the peak lift is reached. However, following the peak lift, it is evident that the inlet valve 44 takes significantly longer to close than for the normal response, as indicated by the much gentler slope of the curve following the peak, and the asymmetry of the response. Indeed, the inlet valve 44 only just closes before the end of the cam stroke cycle. This extension of the time taken for the valve to close is a direct result of the increased viscosity of the hydraulic oil at low temperature. It is clear from the response profile that if the peak lift were higher, the rate of closing would not be sufficient to close the inlet valve 44 before the start of the next cam stroke cycle. This illustrates that a maximum valve lift is defined during cold operation that ensures that the inlet valve 44 closes early enough in the compression stroke to ensure that sufficient air remains trapped in the engine cylinder.

FIG. 4 represents the same information to that shown in FIG. 3, but in an alternative format. In FIG. 4 the response data is represented in a polar plot, with one revolution corresponding to one engine piston cycle, which is represented by a solid, generally circular line 60. Outside the circular line 60, three valve responses are shown with dashed lines, including a full lift response 62, a normal partial lift response 64, and a partial lift response 66 in cold start conditions. Representing the data in this way allows for a clearer indication of how the inlet valve 44 response relates to engine cylinder movement.

As in the FIG. 3 representation, all three of the responses have a peak that coincide at a common point, in this case about one third of the way around the circular line going clockwise. This point corresponds to the inlet maximum opening point (IMOP).

The full lift response 62 starts at a point marked 'IVO' (inlet valve opening), which comes just before 'top-dead-centre', i.e. the highest position that the engine piston reaches in the engine cylinder. Although it appears that an ignition event occurs just after valve opening, it should be appreciated that this graph relates to a four-stroke engine, and therefore valve opening and ignition occur on alternating piston cycles, the spark shown in FIG. 4 being for the engine cylinder, effectively 360° in advance. Valve opening for the other two response profiles 64, 66 occurs at a later point in the cycle.

In the full lift response 62, valve closure occurs about two-thirds of the way around the circular line, at the point marked 'IVC' (inlet valve closure). For the partial lift response 64 valve closure occurs before this point. However, for the cold start response 66 the valve remains open past IVC and into the last quadrant of the cycle; this is an extreme example corresponding to both high valve lift and high engine speed, and would result in entirely unacceptable performance.

There are various ways that the CVVL system 10 could be modified in order to counteract the above described problem of hydraulic lag. For example, a stronger valve spring 46 could be used, so that it is still able to return the valve plunger 28 to its rest position when the oil viscosity is raised. However, since the springs are carefully balanced, such modifications would require significant engineering input, which would be both time consuming and costly. Furthermore, such modifications would be likely to compromise performance of the system 10 during normal operating conditions, which is undesirable.

An alternative solution is provided by embodiments of the present invention, which will now be explained.

As oil viscosity is directly related to its temperature, and the hydraulic lag is determined primarily by the oil viscosity, it follows that the hydraulic lag induced at cold temperatures is variable, depending on the oil temperature. As described above, a maximum valve lift that avoids the valve still being open late into a compression stroke of the engine cylinder is defined by the hydraulic lag. As the hydraulic lag is variable, it follows that the maximum valve lift permissible to ensure the inlet valve 44 is not open late into the compression stroke is variable.

Figure 5:
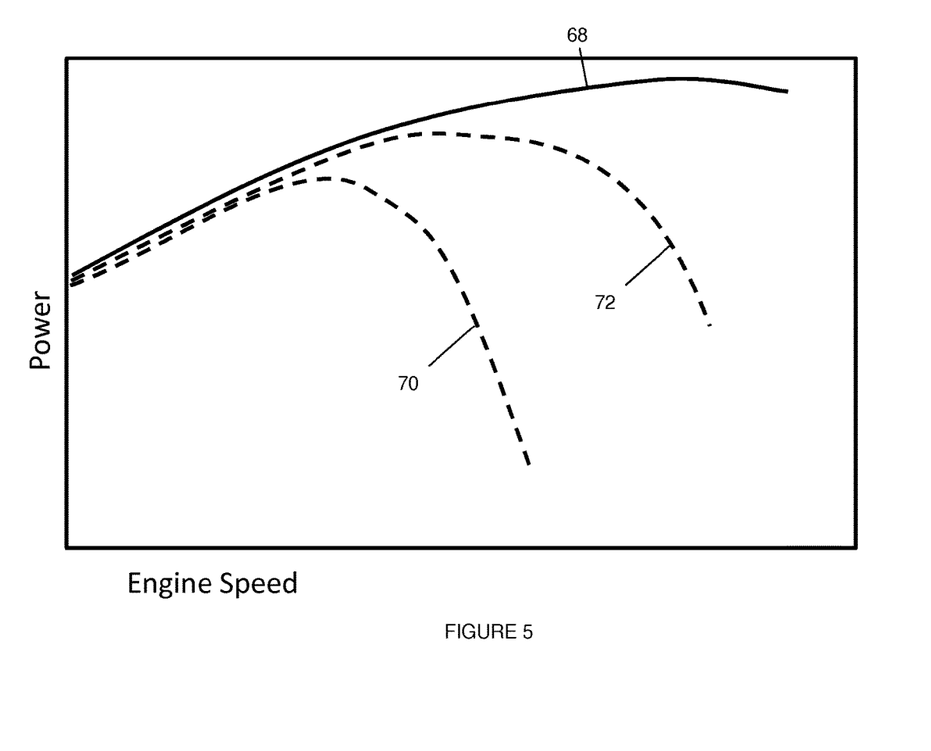
FIG. 5 is a graph showing power curves at three different temperatures for an engine having the CVVL system of FIG. 1.

This effect is demonstrated in FIG. 5, in which power curves for a vehicle engine are shown for three different temperatures.

The uppermost curve 68, represented by a solid line, relates to normal operation, in which there is no hydraulic lag effect. This therefore corresponds to a hydraulic oil temperature of −10° C. and above, namely up to the warmed operational temperature of oil, typically around 90° C. As would be expected, engine power rises with engine speed, with a levelling out effect towards the upper end of the engine speed range.

The lowermost line 70 represents an equivalent power curve for cold start conditions, where the hydraulic oil of the CVVL system 10 is at −30° C. As is evident in the figure, initially the power output rises with engine speed in a similar manner to the normal response of the uppermost line. However, an engine speed threshold is reached beyond which the power output drops sharply despite increasing engine speed. This threshold corresponds closely with the point at which the hydraulic lag causes the inlet valve 44 to remain open too late into a compression stroke in the engine cylinder that the inlet valve 44 is associated with. This is because air is pushed back out of the engine cylinder during the compression stroke, resulting in reduced trapped air in the cylinder, and hence reduced power.

The middle line 72 is a power curve for the engine that started at −30° C. following a short period of warming. It is clear that an engine speed threshold at which power output begins to fall is still present, although it is significantly higher than for the initial cold start response.

Also, the power output does not fall as sharply following the threshold. This is indicative of the fact that the oil viscosity is lower as the oil has started to warm, and so hydraulic lag is reduced in absolute terms. Therefore, a higher engine speed is attained before the point is reached where the inlet valve 44 is still open late into a compression stroke in the engine cylinder, ensuring an acceptable mass of air is trapped in the cylinder.

As the engine continues to warm, the hydraulic lag continues to reduce. Once the engine warms sufficiently that the hydraulic oil is at −10° C. or above, hydraulic lag is eliminated and normal performance is resumed. It is estimated that it will typically take a maximum of two minutes from a cold start for an idling engine to warm sufficiently for the effects of hydraulic lag to become negligible if the highest possible oil viscosity grade is used.

The present invention uses this principle of a varying engine speed threshold to implement a control regime for a vehicle which optimises operation of a vehicle engine at all times.

In a preferred embodiment, the instantaneous hydraulic lag is calculated, from which an engine speed threshold is derived, the engine speed threshold corresponding to the speed beyond which engine power output reduces. The calculated engine speed threshold is then used to control an automatic transmission of the vehicle such that an appropriate gear is selected to ensure that the engine speed remains below the threshold at all times.

Figure 6:
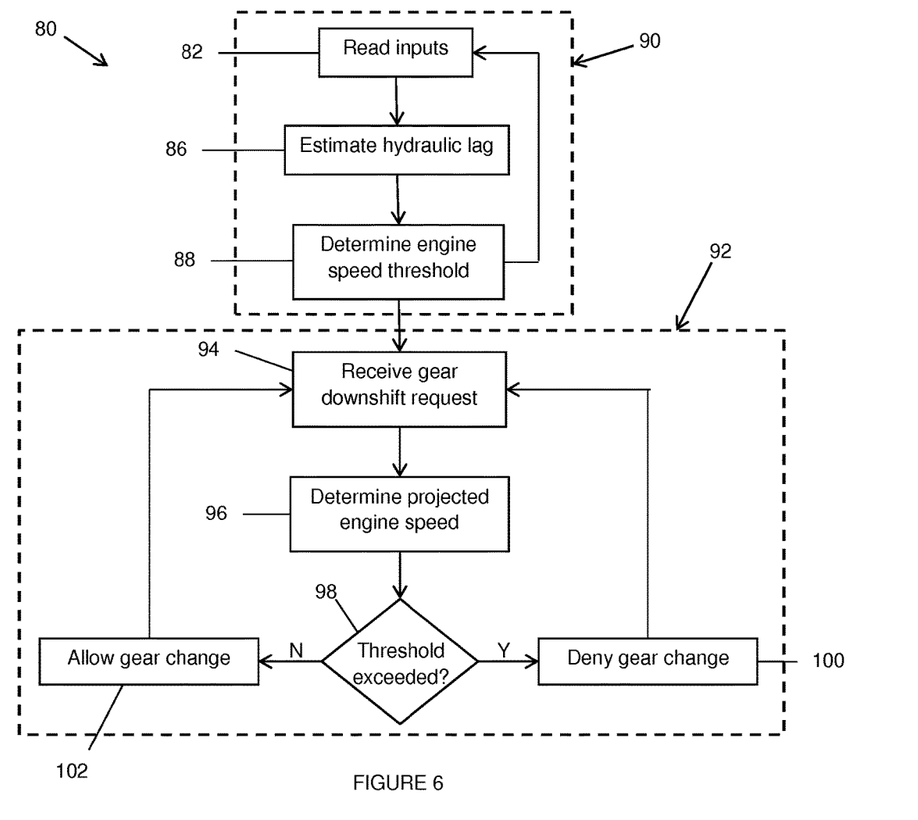
FIG. 6 is a flow diagram showing a vehicle control method according to an embodiment of the invention.

FIG. 6 is a flow diagram which illustrates a process 80 for controlling a vehicle according to an embodiment of the invention in more detail. In this embodiment the process 80 is performed by an engine control module (ECM) in combination with a transmission control module (TCM), although in other embodiments various other vehicle systems may interact to perform the process 80.

Figure 7:
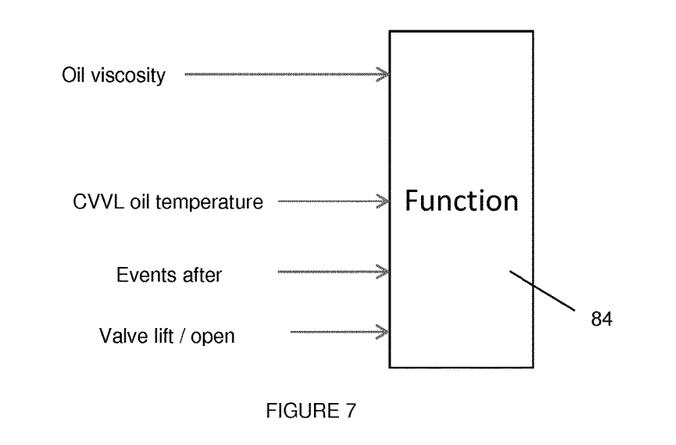
FIG. 7 is a block diagram showing inputs and outputs of the method of FIG. 6.

The process 80 begins with the ECM reading at Step 82 a range of inputs relating to oil viscosity from a set of sensors. A set of example inputs to this stage of the process 80 is shown in FIG. 7. If available, a direct or calculated viscosity reading is used as the input.

Otherwise, passive measurements are used instead as inputs, such as an oil temperature reading, the extent of valve lift, and events after starting the engine which may influence oil viscosity, such as acceleration, which acts to warm the oil more quickly. Another consideration is that when the oil is exposed to shear forces under the action of the cam plunger 26, this can act to reduce the length of polymer chains within the oil: this can have an impact on viscosity, and so is taken into account in the input relating to events after starting.

The inputs are passed to a function 84, which is an algorithm used by the ECM to estimate viscosity. The skilled reader will appreciate that many different algorithms could be used for this purpose.

Returning to FIG. 6, the process 80 continues with the ECM using the input values to determine an instantaneous hydraulic oil viscosity, and from this estimate at Step 86 an instantaneous hydraulic lag. It is noted that the hydraulic lag estimate is in the form of a time constant. It is also noted that optionally a measurement relating to the hydraulic lag, such as the hydraulic oil viscosity, can be used directly without estimating a value for the hydraulic lag.

Once the hydraulic lag has been estimated, an engine speed threshold is determined at Step 88 by calculating the engine speed at which the total time that the inlet valve 44 will remain open implies valve closure at a desired stage in the engine cycle. For example, the engine speed threshold may be chosen such that valve closure completes before a subsequent compression stroke begins, or alternatively the inlet valve may be allowed to remain open into the subsequent compression stroke to a pre-determined extent which is optimised to induct and trap a maximum amount of air.

It is noted that optionally a measurement relating to the hydraulic lag, such as the hydraulic oil viscosity, can be used directly to determine the engine speed threshold without estimating a value for the hydraulic lag, for example by using look-up table values for the viscosity.

The ECM continues to iterate these first three steps of the process 80 as a sub-process 90, so as to provide continuously a real-time value for the engine speed threshold. The current value for the engine speed threshold is passed to the TCM, which iterates a second sub-process 92 for controlling gear changes.

The second sub-process 92 is activated when a gear downshift request is received at Step 94 by the TCM. The downshift request may be generated manually, for example through user interaction with a paddle gearshift system. Alternatively, the downshift request may be generated automatically by the TCM itself by a separate control algorithm, for example if the user has suddenly fully depressed the accelerator pedal of the vehicle, or if the vehicle has slowed.

Since a downshift incurs an increase in engine speed, it is important to prevent implementation of a downshift that would increase the engine speed beyond the engine speed threshold, and therefore compromise engine power output.

Accordingly, the TCM uses the current vehicle speed along with the current engine speed and engine load to determine at Step 96 a projected engine speed for the gear that has been requested. The engine load is taken into account in particular because the operating state of a torque converter associated with the automatic transmission will in part determine a post gear shift engine speed. The projected speed is then compared at Step 98 against the engine speed threshold supplied by the ECM. If the projected speed exceeds the engine speed threshold, the TCM denies at Step 100 the downshift request, and the vehicle continues to operate in the current gear. If the projected engine speed does not exceed the engine speed threshold, the downshift is allowed at Step 102 and implemented by the TCM.

The second sub-process 92 continues to iterate for each new gear change request. For each iteration of the second sub-process 92, the TCM uses the most recent engine speed threshold value supplied by the ECM.

It is noted that once normal operation is established, such that hydraulic lag has become negligible, the engine speed threshold that is output from the first sub-process 90 is equal to engine speed thresholds or limits that are used under normal circumstances to prevent overheating and wear. Therefore, the vehicle operates as normal at this time.

Another way in which engine speed may exceed the threshold that has been determined from the instantaneous hydraulic lag is if the vehicle accelerates. In normal operation, the TCM uses a set of engine speed limits to determine when automatic gear changes should be effected. However, if this were to continue as normal during a cold-start scenario, increasing driving resistance as the vehicle accelerates may result in loss of the ability to accelerate further when the engine speed reaches the threshold determined by hydraulic lag. This is because the driving resistance will reach a point where it balances the reduced available torque. As torque begins to reduce above the engine speed threshold, the vehicle is unable to accelerate further and so cannot reach a speed corresponding to an engine speed at which an automatic upshift would ordinarily be implemented. Therefore, under these circumstances the vehicle would become stuck in its current gear, unable to accelerate further.

For this reason, in this embodiment, the normal engine speed limits for automatic upshifts are replaced with the engine speed threshold calculated by the ECM if it is lower. In this way, upshifts will be implemented automatically in a manner that ensures that the engine speed threshold calculated by the ECM is not exceeded. It is noted that for transmission systems incorporating a manual control mode in which a driver can request upshifts and downshifts using, for example, paddles, automatic upshifting is applied in the same manner as for other automatic transmissions. This ensures that the vehicle does not become trapped in a particular gear.

It will be appreciated by the skilled person that the allocation of control over gear changes is typically divided arbitrarily between the ECM and the TCM, or alternatively additional dedicated controllers may be used in order to aid implementation of the process 80. Therefore, the practical implementation of the process 80 may not be exactly as described above. However, for simplicity it will be assumed that the system behaves as described above throughout the remaining description.

The above process 80 ensures that the transmission is controlled so as to ensure that engine speed remains below a threshold determined by instantaneous hydraulic lag at all times, whilst maximising the engine speed range available to the user. In this way, the process 80 enables the normal use of the vehicle following a cold start, and only restricts performance insofar as is necessitated by hydraulic lag. This approach ensures that the vehicle is never put into a state in which performance is compromised; instead, vehicle performance is deliberately curtailed and held within a range that provides predictable behaviour.

Figure 8:
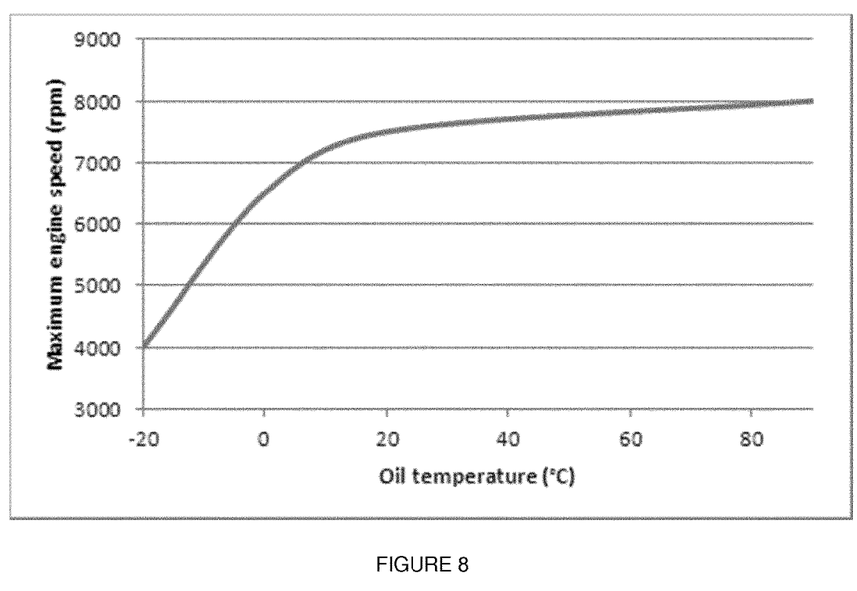
FIG. 8 is a graph showing an example profile for an engine speed threshold against oil temperature of the CVVL system.

FIG. 8 illustrates a typical engine speed threshold profile output from the process 80 of FIG. 7. The graph shown in FIG. 8 plots engine speed threshold values against the temperature of the oil of the CVVL system 10. As shown in the figure, the engine speed threshold rises steeply between −20° C. and 10° C., levelling more gradually thereafter.

The above embodiment provides dynamic control in which a variable engine speed threshold is implemented. In other embodiments, static engine speed thresholds may be used. In the simplest example, a cold start mode may be activated if non-zero hydraulic lag is detected or determined. An engine speed threshold that corresponds to the longest practical hydraulic lag is effected in the cold start mode, such that engine speed is held below this level until the engine has warmed to the extent that hydraulic lag disappears. Once this happens, the cold start mode is deactivated, and normal operation resumes.

In other embodiments, two or more distinct staggered engine speed thresholds are implemented in stages. As noted above, the ECM, TCM or an alternative dedicated controller could be used to implement such a control strategy. For example, the TCM could achieve such control through use of an engine oil temperature signal.

In any of these embodiments, an alert may be output to the user, for example by way of a human-machine interface, to inform them that the vehicle is operating in a cold start mode. In this way, the user is alerted to the fact that vehicle performance has been temporarily restricted, and so does not become concerned that the vehicle has developed a problem.

In an alternative embodiment, the hydraulic lag of the CVVL system 10 may be estimated with reference to a profile or a look-up table, taking into account the initial temperature of the vehicle.

It will be appreciated by a person skilled in the art that the invention could be modified to take many alternative forms to that described herein, without departing from the scope of the appended claims.

In particular, the invention is described in terms of its application to a particular example of a CVVL system 10, whereas the skilled person will understand that the invention could find application in any hydraulic CVVL system 10. The CVVL system 10 described with reference to FIGS. 1 and 2 is included as an example only.

Further aspects of the present invention are set out in the following numbered Clauses:
1. A control method for controlling a transmission of a vehicle, the method comprising:
  receiving at least one measurement relating to a hydraulic lag of a continuously variable valve lift system that occurs in a cold condition, the continuously variable valve lift system being associated with an engine of the vehicle;
estimating a value for the hydraulic lag based on the or each measurement;
determining, based on the value of the hydraulic lag, an engine speed threshold above which engine power output is impaired as a result of the hydraulic lag;
monitoring the engine speed; and
generating an alert if the engine speed exceeds the engine speed threshold.

2. A control method according to clause 1, wherein the transmission is automatic, the method comprising using the alert to control the automatic transmission so as to ensure that the engine speed does not exceed the engine speed threshold.

3. A control method according to clause 2, comprising:
comparing the engine speed threshold based on the estimated hydraulic lag value with a pre-determined engine speed threshold related to a currently selected gear used by the automatic transmission in normal operation;
determining whether the engine speed threshold based on the estimated hydraulic lag value is lower than the pre-determined engine speed threshold; and
replacing the pre-determined engine speed threshold with the engine speed threshold based on the estimated hydraulic lag value in the event that the threshold based on hydraulic lag is lower than the pre-determined threshold.

4. A control method according to clause 2, comprising:
receiving a gear downshift request;
determining an instantaneous vehicle speed;
calculating a projected engine speed for the requested gear based on the instantaneous vehicle speed and engine load;
comparing the projected engine speed with the engine speed threshold; and
denying the downshift request in the event that the projected engine speed is above the engine speed threshold.

5. A control method according to clause 4, comprising allowing the downshift request in the event that the projected engine speed is below the engine speed threshold.

6. A control method according to clause 2, comprising effecting a gear upshift automatically via the automatic transmission in the event that the engine speed reaches the engine speed threshold based on the hydraulic lag.

7. A control method according to clause 2, wherein the at least one measurement relating to a hydraulic lag is one or more of the group consisting of: oil viscosity in the continuously variable valve lift system; oil temperature in the continuously variable valve lift system; an inlet valve lift; and events after engine ignition.

8. A vehicle control system for controlling a transmission of a vehicle, the system comprising:
a sensor arranged to receive at least one measurement relating to a hydraulic lag of a continuously variable valve lift system that occurs in a cold condition, the continuously variable valve lift system being associated with an engine of the vehicle;
a processor arranged to estimate a value for the hydraulic lag based on the or each measurement, and to determine, based on the value of the hydraulic lag, an engine speed threshold above which engine power output is impaired as a result of the hydraulic lag;
a monitoring module arranged to monitor the engine speed; and
an output arranged to generate an alert if the engine speed exceeds the engine speed threshold.

9. A system according to clause 8, wherein the transmission is an automatic transmission, the system comprising a controller arranged to control the automatic transmission of the vehicle in response to the alert so as to ensure that the engine speed does not exceed the engine speed threshold, thereby to maintain engine power output.

10. A system according to clause 9, wherein the sensor comprises a temperature sensor arranged to output a measurement indicative of a temperature of oil in the continuously variable valve lift system.

11. A system according to clause 9, wherein the sensor comprises at least one of a viscometer and a rheometer arranged to output a measurement indicative of a viscosity of oil in the continuously variable valve lift system.

12. A non-transitory computer readable medium loaded with computer code arranged to effect the method of clause 1.

13. A processor arranged to implement the method of clause 1.

14. A vehicle arranged to implement the method of clause 1.

15. A vehicle comprising the system of clause 8.

16. A vehicle comprising the processor of clause 13.

17. A control method for controlling a transmission of a vehicle, the method comprising:
receiving at least one measurement relating to a cold condition parameter of a continuously variable valve lift system, the continuously variable valve lift system being associated with an engine of the vehicle;
estimating a value for the parameter based on the or each measurement;
determining, based on the value of the parameter, an engine speed threshold above which engine power output is impaired as a result of the parameter;
monitoring the engine speed; and
generating an alert if the engine speed exceeds the engine speed threshold.

18. A control method according to clause 17, wherein the transmission is automatic, the method comprising using the alert to control the automatic transmission so as to ensure that the engine speed does not exceed the engine speed threshold.

The invention claimed is:

1. A control method for controlling a transmission of a vehicle, the method comprising:
receiving at least one measurement from a sensor, the measurement relating to a cold condition parameter of a continuously variable valve lift system, the continuously variable valve lift system being associated with an engine of the vehicle;
determining, by a processor, based on the at least one measurement relating to the cold condition parameter, an engine speed threshold above which engine power output is impaired as a result of the cold condition parameter;
monitoring an engine speed of the engine;
generating an alert if the engine speed exceeds the engine speed threshold; and
controlling the transmission based on the alert.

2. A control method according to claim 1, wherein the transmission is automatic, the method comprising using the alert to control the automatic transmission so as to ensure that the engine speed is brought below the engine speed threshold.

3. A control method according to claim 2, comprising:
comparing the engine speed threshold with a pre-determined engine speed limit related to a currently selected gear used by the automatic transmission in normal operation;
determining whether the engine speed threshold is lower than the pre-determined engine speed limit; and
replacing the pre-determined engine speed limit with the engine speed threshold in the event that the engine speed threshold based on the at least one measurement is lower than the pre-determined engine speed limit.

4. A control method according to claim 2, comprising:
receiving a gear downshift request;
determining an instantaneous vehicle speed;
calculating a projected engine speed for a requested gear of the gear downshift request based on the instantaneous vehicle speed and engine load;
comparing the projected engine speed with the engine speed threshold; and
denying the downshift request in the event that the projected engine speed is above the engine speed threshold.

5. A control method according to claim 4, comprising allowing the downshift request in the event that the projected engine speed is below the engine speed threshold.

6. A control method according to claim 2, comprising effecting a gear upshift automatically via the automatic transmission in the event that the engine speed reaches the engine speed threshold.

7. A control method according to claim 1, wherein the at least one measurement relating to the cold condition parameter is one or more of the group consisting of: oil viscosity in the continuously variable valve lift system; oil temperature in the continuously variable valve lift system; and an inlet valve lift.

8. A control method according to claim 1, wherein the cold condition parameter of the continuously variable valve lift system is a hydraulic lag of the continuously variable valve lift system that occurs in a cold condition.

9. A vehicle control system for controlling a transmission of a vehicle, the system comprising:
a sensor configured to provide at least one measurement relating to a cold condition parameter of a continuously variable valve lift system, the continuously variable valve lift system being associated with an engine of the vehicle;
a processor configured to determine, based on the at least one measurement relating to the cold condition parameter, an engine speed threshold above which engine power output is impaired as a result of the cold condition parameter;
a monitoring module configured to monitor an engine speed of the engine; and
an output configured to generate an alert if the engine speed exceeds the engine speed threshold.

10. A system according to claim 9, wherein the transmission is an automatic transmission, the system comprising a controller configured to control the automatic transmission of the vehicle in response to the alert so as to ensure that the engine speed is brought below the engine speed threshold, thereby to maintain engine power output.

11. A system according to claim 10, wherein the sensor comprises a temperature sensor arranged to output a measurement indicative of a temperature of oil in the continuously variable valve lift system.

12. A system according to claim 9, wherein the sensor comprises at least one of a viscometer and a rheometer arranged to output a measurement indicative of a viscosity of oil in the continuously variable valve lift system.

13. A system according to claim 9, wherein the cold condition parameter of the continuously variable valve lift system is a hydraulic lag of the continuously variable valve lift system that occurs in a cold condition.

14. A processor configured to:
receive at least one measurement from a sensor, the measurement relating to a cold condition parameter of a continuously variable valve lift system, the continuously variable valve lift system being associated with an engine of a vehicle;
determine, based on the at least one measurement, an engine speed threshold above which engine power output is impaired as a result of the cold condition parameter;
monitor an engine speed of the engine;
generate an alert if the engine speed exceeds the engine speed threshold; and
control a transmission of the vehicle based on the alert.

15. A vehicle comprising:
an engine;
a transmission;
a continuously variable valve lift system associated with the engine;
a sensor configured to provide at least one measurement relating to a cold condition parameter of the continuously variable valve lift system;
a processor configured to determine, based on the at least one measurement, an engine speed threshold above which engine power output is impaired as a result of the cold condition parameter;
a monitoring module configured to monitor an engine speed of the engine; and
an output configured to generate an alert if the engine speed exceeds the engine speed threshold.

* * * * *